(12) United States Patent
Wang et al.

(10) Patent No.: US 7,386,205 B2
(45) Date of Patent: Jun. 10, 2008

(54) OPTICAL DEVICE AND METHOD FOR MAKING SAME

(76) Inventors: Jian Wang, 5923 Derick Dr., Orefield, PA (US) 18069; Xuegong Deng, 87 Royal Dr., #430, Piscataway, NJ (US) 08854

(*) Notice: Subject to any disclaimer, the term of this patent is extended or adjusted under 35 U.S.C. 154(b) by 0 days.

(21) Appl. No.: 10/463,279

(22) Filed: Jun. 17, 2003

(65) Prior Publication Data
US 2004/0047388 A1    Mar. 11, 2004

Related U.S. Application Data

(60) Provisional application No. 60/389,224, filed on Jun. 17, 2002.

(51) Int. Cl.
*G02B 6/34* (2006.01)
(52) U.S. Cl. .......................... 385/37; 372/92
(58) Field of Classification Search ................ 372/106, 372/50.1, 92, 98; 977/949, 954, 953, 951, 977/834, 832
See application file for complete search history.

(56) References Cited

U.S. PATENT DOCUMENTS

| | | |
|---|---|---|
| 4,615,034 A | 9/1986 | Von Gunten et al. |
| 4,638,669 A | 1/1987 | Chou |
| 4,650,289 A | 3/1987 | Kuwahara |
| 4,732,444 A | 3/1988 | Papuchon et al. |
| 4,763,972 A | 8/1988 | Papuchon et al. |
| 4,778,234 A | 10/1988 | Papuchon et al. |
| 4,998,793 A | 3/1991 | Henry et al. |
| 5,077,816 A | 12/1991 | Glomb et al. |
| 5,088,105 A | 2/1992 | Scifres et al. |
| 5,091,981 A | 2/1992 | Cunningham |
| 5,283,845 A | 2/1994 | Ip |
| 5,299,212 A | 3/1994 | Koch et al. |
| 5,461,246 A | 10/1995 | Chou |
| 5,467,415 A | 11/1995 | Presby |
| 5,505,804 A * | 4/1996 | Mizuguchi et al. ......... 156/154 |
| RE35,337 E | 9/1996 | Patel et al. |
| 5,617,234 A | 4/1997 | Koga et al. |
| 5,654,818 A | 8/1997 | Yao |
| 5,691,989 A | 11/1997 | Rakuljic et al. |
| 5,706,301 A | 1/1998 | Lagerstrom |
| 5,719,976 A | 2/1998 | Henry et al. |
| 5,726,805 A | 3/1998 | Kaushik et al. |
| 5,772,905 A * | 6/1998 | Chou .......................... 216/44 |
| 5,777,793 A | 7/1998 | Little et al. |
| 5,793,784 A | 8/1998 | Wagshul et al. |

(Continued)

OTHER PUBLICATIONS

Austin, M., et al., "Fabrication for nanocontacts for molecular devices using nanoimprint lithography," J. Vac. Sci. Technol. B 20(2), Mar./Apr. 2002, pp. 665-667.

(Continued)

*Primary Examiner*—Minsun Oh Harvey
*Assistant Examiner*—Tuan N. Nguyen
(74) *Attorney, Agent, or Firm*—Fish & Richardson, P.C.

(57) ABSTRACT

The present invention is directed to a device for reflecting a select polarization of at least one transmission having a given wavelength impinging upon the device. The device includes a substrate and a layer of nanostructures. The nanostructures form a resonant pattern on the substrate adapted to define a plurality of high contrast refractive index interfaces suitable for reflecting the select polarization of the at least one transmission.

48 Claims, 15 Drawing Sheets

U.S. PATENT DOCUMENTS

| | | |
|---|---|---|
| 5,820,769 A | 10/1998 | Chou |
| 5,848,080 A | 12/1998 | Dahm |
| 5,852,688 A | 12/1998 | Brinkman et al. |
| 5,870,421 A | 2/1999 | Dahm |
| 5,956,216 A | 9/1999 | Chou |
| 5,966,483 A | 10/1999 | Chowdhury |
| 5,973,316 A | 10/1999 | Ebbesen et al. |
| 5,973,784 A | 10/1999 | Szwaykowski et al. |
| 6,035,089 A | 3/2000 | Grann et al. |
| 6,037,644 A | 3/2000 | Daghighian et al. |
| 6,040,936 A | 3/2000 | Kim et al. |
| 6,052,238 A | 4/2000 | Ebbesen et al. |
| 6,064,506 A | 5/2000 | Koors |
| 6,069,380 A | 5/2000 | Chou et al. |
| 6,075,915 A | 6/2000 | Koops et al. |
| 6,101,300 A | 8/2000 | Fan et al. |
| 6,122,103 A | 9/2000 | Perkins et al. |
| 6,122,301 A | 9/2000 | Tei et al. |
| 6,125,220 A | 9/2000 | Copner et al. |
| 6,130,969 A | 10/2000 | Villeneuve et al. |
| 6,137,939 A | 10/2000 | Lesesky et al. |
| 6,154,318 A | 11/2000 | Austin et al. |
| 6,154,479 A | 11/2000 | Yoshikawa et al. |
| 6,169,825 B1 | 1/2001 | Morey et al. |
| 6,175,667 B1 | 1/2001 | Wang et al. |
| 6,191,890 B1 | 2/2001 | Baets et al. |
| 6,198,557 B1 | 3/2001 | Dultz et al. |
| 6,198,860 B1 | 3/2001 | Johnson et al. |
| 6,208,463 B1 | 3/2001 | Hansen et al. |
| 6,215,928 B1 * | 4/2001 | Friesem et al. ............... 385/37 |
| 6,233,375 B1 | 5/2001 | Lang et al. |
| 6,233,380 B1 | 5/2001 | Ferrieu |
| 6,235,141 B1 | 5/2001 | Feldman et al. |
| 6,240,109 B1 | 5/2001 | Shieh |
| 6,251,297 B1 | 6/2001 | Komuro et al. |
| 6,252,709 B1 | 6/2001 | Sato |
| 6,253,009 B1 | 6/2001 | Lestra et al. |
| 6,258,614 B1 * | 7/2001 | Kaneko ....................... 438/22 |
| 6,260,388 B1 | 7/2001 | Borrelli et al. |
| 6,262,002 B1 | 7/2001 | Carey |
| 6,263,002 B1 | 7/2001 | Hsu et al. |
| 6,275,291 B1 | 8/2001 | Abraham et al. |
| 6,285,810 B1 | 9/2001 | Fincato et al. |
| 6,288,840 B1 | 9/2001 | Perkins et al. |
| 6,309,580 B1 | 10/2001 | Chou |
| 6,317,554 B1 | 11/2001 | Kosaka et al. |
| 6,324,192 B1 | 11/2001 | Tayebati |
| 6,339,603 B1 | 1/2002 | Flanders et al. |
| 6,349,103 B1 | 2/2002 | Chung et al. |
| 6,353,623 B1 | 3/2002 | Munks et al. |
| 6,359,915 B1 | 3/2002 | Koch et al. |
| 6,370,177 B1 | 4/2002 | Genei et al. |
| 6,371,662 B1 | 4/2002 | Leard et al. |
| 6,374,016 B2 | 4/2002 | Albert et al. |
| 6,400,860 B1 | 6/2002 | Chandrasekhar et al. |
| 6,410,416 B1 | 6/2002 | Dodabalapur et al. |
| 6,482,742 B1 | 11/2002 | Chou |
| 6,518,189 B1 | 2/2003 | Chou |
| 6,545,739 B1 * | 4/2003 | Matsumoto et al. ........ 349/198 |
| 6,618,104 B1 | 9/2003 | Date et al. |
| 6,661,952 B2 * | 12/2003 | Simpson et al. ............... 385/37 |
| 6,692,797 B1 | 2/2004 | Owen et al. |
| 6,711,200 B1 * | 3/2004 | Scherer et al. ................ 372/64 |
| 6,713,238 B1 | 3/2004 | Chou et al. |
| 6,785,050 B2 * | 8/2004 | Lines et al. ................. 359/486 |
| 6,816,525 B2 * | 11/2004 | Stintz et al. ............. 372/45.01 |

OTHER PUBLICATIONS

Austin, M., et al., "Fabrication of 70 nm channel length polymer organic thin-film transistors using nanoimprint lithography," Appl. Phys. Lett. 81 (23), Dec. 2, 2002, pp. 4431-4433.

Bird, G.R. et al., "The Wire Grid as a Near-Infrared Polarizer," J. of the Optical Soc. of America, 50 (9), 886-890, (1960).

Born, Max, and Wolf, Emil: Principles of Optics: Electromagnetic Theory of Propagation, Interference and Diffraction of Light 7th ed. Oct. 1, 1999. Cambridge University Press. p. 790.

Brundrett, D. L.., et al., "Normal-incidence guided-mode resonant grating filters: design and experimental demonstration" Optics Lett., May 1, 1998;23(9):700-702.

Cao, H., et al., "Fabrication of 10 nm enclosed nanofluidic channels," Appl. Phys. Lett. 81 (1), Jul. 1, 2002, pp. 174-176.

Cao, H., et al., "Gradient Nanostructures for interfacing microfluidics and nanofluidics," Appl. Phys. Lett. 81(16), Oct. 14, 2002, pp. 3058-3060.

Chang, Allan S. P., et al. "A new two-dimensional subwavelength resonant grating filter fabricated by nanoimprint lithography" Department of Electrical Engineering, NanoStructures Laboratory, Princeton University.

Chigrin, D. N., et al., "Observation of total omnidirectional reflection from a one-dimensional dielectric lattice" Appl. Phy. A. 1999;68:25-28.

Chou, S. Y., et al., "Subwavelength transmission gratings and their applications in VCSELs" Proc. SPIE. 1997; 3290:73-81.

Chou, S. Y., et al., "Observation of Electron Velocity Overshoot in Sub-100-nm-channel MOSFET's in Silicon," IEEE Electron Device Letters, vol. EDL-6, No. 12, Dec. 1985, pp. 665-667.

Chou, S.Y., et al., "Imprint Lithography with 25-Nanometer Resolution" Apr. 5, 1996;272(5258):85-87.

Chou, S.Y. , et al., "Sub-10 nm imprint lithography and applications" J. Vac. Sci. Technol. B Nov./Dec. 1997;15(6):2897-2904.

Chou, S., et al., "Imprint of sub-25 nm vias and trenches in polymers," Appl. Phys., Lett. 67 (21), Nov. 20, 1995, pp. 3114-3116.

Chou, S., et al., "Lateral Resonant Tunneling Transistors Employing Field-Induced Quantum Wells and Barriers," Proceedings of the IEEE, vol. 79, No. 8, Aug. 1991, pp. 1131-1139.

Chou, S., et al., "Nanoscale Tera-Hertz Metal-Semiconductor-Metal Photodetectors," IEEE Journal of Quantum Electronics, vol. 28, No. 10, Oct. 1992, pp. 2358-2368.

Chou, S., et al., "Ultrafast and direct imprint of nanostructures in silicon," Nature, vol. 417, Jun. 20, 2002. pp. 835-837.

Chou, S., G.A., "Patterned Magnetic Nanostructures and Quantized Magnetic Disks," Proceedings of the IEEE, vol. 85, No. 4, Apr. 1997, pp. 652-671.

Cui, B.,et al., "Perpendicular quantized magnetic disks with 45 Gbits on a 4×2 $cm^2$ area," Journal of Applied Physics, vol. 85, No. 8, Apr. 15, 1999, pp. 5534-5536.

Deshpande, P., et al., "Lithographically induced self-assembly of microstructures with a liquid-filled gap between the mask and polymer surface," J. Vac. Sci. Technol. B 19(6), Nov./Dec. 2001, pp. 2741-2744.

Deshpande, P., et al., "Observation of dynamic behavior lithographically induced self-assembly of supromolecular periodic pillar arrays in a homopolymer film," Appl. Phys. Lett. 79 (11), Sep. 10, 2001, pp. 1688-1690.

Fan, S., et al., "Design of three-dimensional photonic crystals at submicron lengthscales" Appl. Phys. Lett. Sep. 12, 1994;65(11)1466-1468.

Feiertag, G. , et al., "Fabrication of photonic crystals by deep x-ray lithography" Appl. Phys. Lett., Sep. 15, 1997;71(11):1441-1443.

Fink, Y., et al, "Guiding optical light in air using an all-dielectric structure" J. Lightwave Techn. Nov. 1999;17(11):2039-2041.

Fink, Y., et al, "A dielectric omnidirectional reflector" Science. Nov. 27, 1998;282:1679-1682.

Fischer, P.B., et al., "10 nm electron beam lithography and sub-50 nm overlay using a modified scanning electron microscope," Appl. Phys. Lett. 62 (23), Jun. 7, 1993, pp. 2989-2991.

Flanders, D.C., "Submicrometer periodicity gratings as artificial anisotropic dielectrics," Appl. Phys. Lett. 42 (6), 492-494 (1983)

Gabathuler, W., et al., "Electro-nanomechanically wavelength-tunable integrated-optical bragg reflectors Part II: Stable device operation" Optics Communications. Jan. 1, 1998;145:258-264.

Gaylord, Thomas K., et al., "Analysis and applications of optical diffraction by gratings," Proc. IEEE. May 1985;73(5):894-937.

Goeman, S., et al., "First demonstration of highly reflective and highly polarization selective diffraction gratings (GIRO-Gratings) for long-wavelength VCSEL's" IEEE Photon. Technol. Lett. Sep. 1998;10(9):1205-1207.

Hayakawa, Tomokazu, et al, "ARROW-B Type Polarization Splitter with Asymmetric Y-Branch Fabricated by a Self-Alignment Process," J. Lightwave Techn, 15(7), 1165-1170, (1997).

Hereth, R., et al, "Broad-band optical directional couplers and polarization splitter," J. Lightwave Techn., 7(6), 925-930, (1989).

Ho, K.M., et al., "Existance of a photonic gap in periodic dielectric structures" Dec. 17, 1990;65(25):3152-3155.

Ibanescu, M., et al., "An all-dielectric coaxial waveguide" Science. Jul. 21, 2000;289:415-419.

Joannopoulos, J.D., et al., "Photonic crystals: putting a new twist on light" Nature. Mar. 13, 1997(6621):143-149.

Kokubun, Y. , et al, "ARROW-Type Polarizer Utilizing Form Birefringence in Multilayer First Cladding," IEEE Photon. Techn. Lett., 11(9), 1418-1420, (1993).

Kuksenkov, D. V. , et al., "Polarization related properties of vertical-cavity surface-emitting lasers" IEEE J. of Selected Topics in Quantum Electronics. Apr. 1997;3(2):390-395.

Levi, B.G. , "Visible progress made in three-dimensional photonic 'crystals'" Physics Today. Jan. 1999;52(1):17-19.

Li, M., et al., "Direct three-dimensional patterning using nanoimprint lithography," Appl. Phys. Lett. 78 (21), May 21, 2001, pp. 3322-3324.

Li, M., et al., "Fabrication of circular optical structures with a 20 nm minimum feature using nanoimprint lithography," Appl. Phys. Lett. 76 (6), Feb. 7, 2000, pp. 673-675.

Magel, G.A., "Integrated optic devices using micromachined metal membranes" SPIE. Jan. 1996;2686:54-63.

Magnusson, R., et al., "New principle for optical filters" Appl. Phys. Lett. Aug. 31, 1992;61(9):1022-1023.

Mashev, L., et al., "Zero order anomaly of dielectric coated gratings" Optics Communications. Oct. 15, 1985; 55(6):377-380.

Moharam, M. G., et al., "Rigorous coupled-wave analysis of planar-grating diffraction" J. Opt. Soc. Am. Jul. 1981;71(7):811-818.

Mukaihara, T., et al., "Engineered polarization control of GaAs/AlGaAs surface emitting lasers by anisotropic stress from elliptical etched substrate hole" IEEE Photon. Technol. Lett. Feb. 1993;5(2):133-135.

Noda, S., et al., "New realization method for three-dimensional photonic crystal in optical wavelength region" Jpn. J. Appl. Phys. Jul. 15, 1996;35:L909-L912.

Oh, M., et al., "Polymeric waveguide polarization splitter with a buried birefringent polymer" IEEE Photon. Techn. Lett. Sep. 1999;11(9):1144-1146.

Painter, O. , et al., "Lithographic tuning of a two-dimensional photonic crystal laser array" IEEE Photon. Techn. Lett., Sep. 2000;12(9):1126-1128.

Painter, O., et al., "Room temperature photonic crystal defect lasers at near-infrared wavelengths in InGaAsP" J. Lightwave Techn., Nov. 1999;17(11):2082-2088.

Peng, S., et al., "Experimental demonstration of resonant anomalies in diffraction from two-dimensional gratings" Optics Lett. Apr. 15, 1996;21(8):549-551.

Ripin, D. J., et al., "One-dimensional photonic bandgap microcavities for strong optical confinement in GaAs and GaAs/AlxOy semiconductor waveguides" J. Lightwave Techn. Nov. 1999;17(11):2152-2160.

Rokhinson, L.P., et al., "Double-dot charge transport in Si single-electron/hole transistors," Appl. Phys. Lett. 76 (12), Mar. 20, 2000, pp. 1591-1593.

Rokhinson, L.P., et al., "Kondo-like zero-bias anomaly in electronic transport through an ultrasmall Si quantum dot," Physical Review B, vol. 60, No. 24, Dec. 15, 1999, pp. 319-321.

Rokhinson, L.P., et al., "Magnetically Induced Reconstruction of the Ground State in a Few-Electron Si Quantum Dot," Physical Review Letters, vol. 87, No. 16, Oct. 15, 2001, pp. 1-3.

Rudin, A., et al., "Charge-ring model for the charge-induced confinement enhancement in stacked quantum-dot transistors," Appl. Phys. Lett. 73 (23), Dec. 7, 1998, pp. 3429-3431.

Russell, P. St. J., et al., "Full photonic bandgaps and spontaneous emission control in 1D multilayer dielectric structures" Opt. Commun. Feb. 1, 1999;160:66-71.

Rytov, S. M., "Electromagnetic properties of a finely stratified medium" Soviet Physics JETP (Journal of Experimental & Theoretical Physics). May 1956;2(1):466-475.

Schablitsky, S., et al., "Controlling polarization of vertical-cavity surface-emitting lasers using amorphous silicon subwavelength transmission gratings," Appl. Phys. Lett. 69 (1), Jul. 1, 1996, pp. 7-9.

Sharon, A., et al., "Narrow spectral bandwidths with grating waveguide structures" Appl.Phys.Lett. Dec. 30, 1996;69(27):4154-4156.

Sugimoto, Y., et al., "Experimental verification of guided modes in 60 degrees—bent defect waveguides in AlGaAs-based air-bridge-type two-dimensional photonic crystal slabs" J. Appl. Phys. Mar. 1, 2002;91(5):3477-3479.

Sun, X., et al., "Multilayer resist methods for nanoimprint lithography on nonflat surfaces" J. Vac. Sci. Technol. B. Nov./Dec. 1998;16(6)3922-3925.

Tibuleac, S., et al., "Reflection and transmission guided-mode resonance filters" J. Opt. Soc. Am. A. Jul. 1997;14(7):1617-1626.

Trutschel, U. , et al, "Polarization splitter based on anti-resonant reflecting optical waveguides," J Lightwave Techn., 13(2), 239-243, (1995).

Tyan, R.C., et al., "Design, fabrication and characterization of form-birefringent multilayer polarizing beam splitter" J. Opt. Soc. Am. A. Jul. 1997;14(7):1627-1636.

Tyan, R. et al., "Polarizing beam splitters constructed of form-birefringent multilayer gratings," SPIE 2689, 82-89.

van Blaaderenm, Alfons, "Opals in a New Light" Science. Oct. 30, 1998; 282(5390):887-888.

van Doorn, A. K. Jansen, et al., "Strain-induced birefringence in vertical-cavity semiconductor lasers" IEEE J. Quantum Electronics. Apr. 1998;34(4):700-706.

Vellekoop, A.R. et al, "A small-size polarization splitter based on a planar phase optical phased array," J Lightwave Techn., 8(1), 118-124, (1990).

Wang, J., et al., "Molecular alignment in submicron patterned polymer matrix using nano-imprint lithography," Appl. Phys. Lett. 77 (2), Jul. 10, 2000, pp. 166-168.

Wang, J., et al., "Fabrication of a new broadband waveguide polarizer with a double-layer 190 nm period metal-gratings using nanoimprint lithography" J. Vac. Sci. Technol. B. Nov./Dec. 1999;17(6):2957-2960.

Wang, S. S., et al., "Design of waveguide-grating filters with symmetrical line shapes and low sidebands" Opt. Lett. Jun. 15, 1994;19(12):919-921.

Wang, S. S., et al., "Guided-mode resonances in planar dielectric-layer diffraction gratings" J. Opt. Soc. Am. A. Aug. 1990;7(8):1470-1475.

Weber, M. F., Stover, C.A., Gilbert, L.R. , Nevitt, T.J. , Ouderkirk, A.J. "Giant birefringent optics in multilayer polymer mirrors," Science, 287, 2451-2456, Mar. 31, 2000.

Winn, J. N., et al., "Omnidirectional reflection from a one-dimensional photonic crystal" Opt. Lett. Oct. 15, 1998;23(20):1573-1575.

Wu, L., et al., "Dynamic modeling and scaling of nanostructure formation in the lithographically induced self-assembly and self-construction" Appl. Phys. Lett. May 12, 2003;82(19):3200-3202.

Yablonovitch, E., "Inhibited spontaneous emission in solid-state physics and electronics" Phys. Rev. Lett. May 18, 1987;58(20):2059-2062.

Yablonovitch, E., et al., "Photonic band structure: The face-centered-cubic case employing nonspherical atoms" Phys. Rev. Lett. Oct. 21, 1991;67(17):2295-2298.

Yanagawa, H., et al, "High extinction guided-wave optical polarization splitter," IEEE Photon. Techn. Lett., 3(1), 17-18, (1991).

Yoshikawa, T., et al., "Polarization-controlled single-mode VCSEL" IEEE J. Quantum Electronics. Jun. 1998;34(6):1009-1015.

Yu, Z., et al., "Reflective polarizer based on a stacked double-layer subwavelength metal grating structure fabricated using nanoimprint lithography," Appl. Phys. Lett. 77(7), Aug. 14, 2000, pp. 927-929.

Zakhidov, A.A., et al., "Carbon structures with three-dimensional periodicity at optical wavelengths" Science. Oct. 30, 1998;282(5390):897-901.

* cited by examiner

OPTICAL DEVICE AND METHOD FOR MAKING SAME

CROSS REFERENCES TO RELATED APPLICATIONS

This application claims the benefit of U.S. Provisional Application No. 60/389,224, filed Jun. 17, 2002, entitled "OPTICAL DEVICE AND METHOD OF MAKING SAME", with the named Inventors Jian Wang, Xuegong Deng and Yong Kewan Park.

FIELD OF THE INVENTION

The present invention relates generally to optical components being suitable for forming or including polarizing mirrors, mirrors, beam splitters, combiners, and/or array optics.

BACKGROUND OF THE INVENTION

Broadband mirrors have important applications in photonics and optoelectronics. Conventionally there are two methods of producing mirrors: (1) using a surface of a metal layer, or (2) using multilayer dielectric films. Metal layers generally provide robust performance with respect to angle of incidence properties, wavelength dependence, and polarization characteristics. However, a major limitation stems from the non-unity reflectivity of metal materials across different wavelength bands. Further, wavelength selectivity may be difficult to achieve. On the other hand, multilayer dielectric interference mirrors may typically be used for applications requiring high reflectivity or wavelength-selective applications. However, multilayer dielectric interference mirror generally lack good performance qualities with respect to angle of incidence, and typically require alternating layers of materials having relatively high and low refractive indices, respectfully.

SUMMARY OF THE INVENTION

A device for reflecting a select polarization of at least one transmission having a given wavelength impinging upon the device, the device including: a substrate; and, a layer of nanostructures forming a resonant pattern on the substrate adapted to define a plurality of high contrast refractive index interfaces suitable for reflecting the select polarization of the at least one transmission.

BRIEF DESCRIPTION OF THE FIGURES

Understanding of the present invention may be facilitated by consideration of the following detailed description of the preferred embodiments of the present invention taken in conjunction with the accompanying drawings, in which like numerals refer to like parts and in which.

DETAILED DESCRIPTION OF THE PREFERRED EMBODIMENTS

Figure 1:
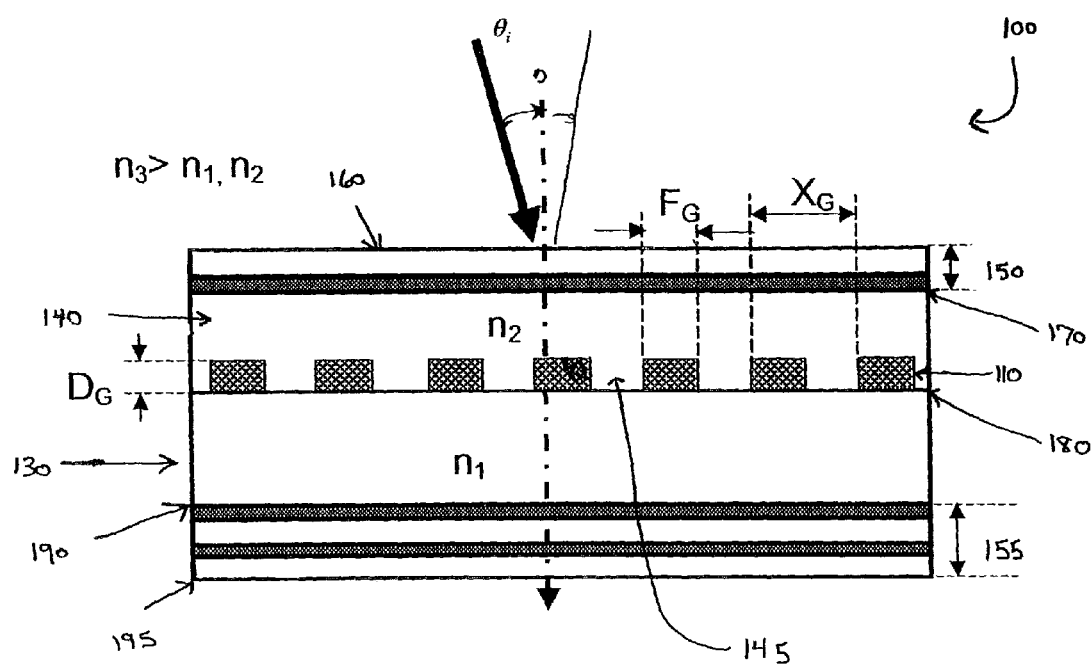
FIG. 1A illustrates a cross-sectional view of a resonant mirror according to an aspect of the present invention.
FIG. 1B illustrates a cross-sectional view of a resonant mirror exhibiting polarization independent properties according to an aspect of the present invention.

It is to be understood that the figures and descriptions of the present invention have been simplified to illustrate elements that are relevant for a clear understanding of the present invention, while eliminating, for the purpose of clarity, many other elements found in typical photonic components and methods of manufacturing the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Referring now to FIG. 1A, there is shown a cross-sectional view of a resonant mirror 100 according to an aspect of the present invention. Resonant mirror 100 may include a substrate 130, a pattern of subwavelength elements, such as nanostructures or nanoelements 110, a cladding layer 140 and antireflection coatings 150, 155.

As shown in FIG. 1A, pattern of nanostructures 110 may be formed on a surface of substrate 130. Pattern of nanostructures 110 may include structures with dimensions in the range 0.1 nm to 1000 nm. An interface 180 may be created between substrate 130 and pattern of nanostructures 110. Cladding layer 140 may be added distal to interface 180 on pattern of nanostructures 110. Antireflection coating 150 may be formed on a surface of the cladding layer 140 distally located from interface 180, thereby creating interface 170 there between. A surface of anti-reflection coating 150 distal to interface 170 may form an interface 160. Anti-reflection coating 155 may be applied to a surface of substrate 130 distal to interface 180, thereby creating interface 190 there between. The surface of anti-reflection coating 155 distal to interface 190 may form an interface 195.

Resonant mirror 100 may be made from materials suitable for use in optics and known by those possessing ordinary skill in the pertinent arts. In forming resonant mirror 100 the high contrast refractive index requirement to achieve high reflectivity may be by regions within nanostructures 110. Suitable materials may include materials commonly used in the art of grating or optic manufacturing such as glass (like BK7, Quartz and Zerodur, for example), semiconductors, and polymers, including for example GaAs/AlGaAs, GaAs/AlAs, Si/SiO$_2$ and SiN$_x$/SiO$_2$ pairs, for example. According to an aspect of the present invention, an underlying one-dimensional (1-D) pattern of nanostructures 110, preferably formed of materials of high contrast reflective index may be formed on substrate 130. According to an aspect of the present invention, two-dimensional (2-D) patterns of nanostructures 110, preferably formed of materials of high contract refractive index may be formed on substrate 130.

Figure 1B:
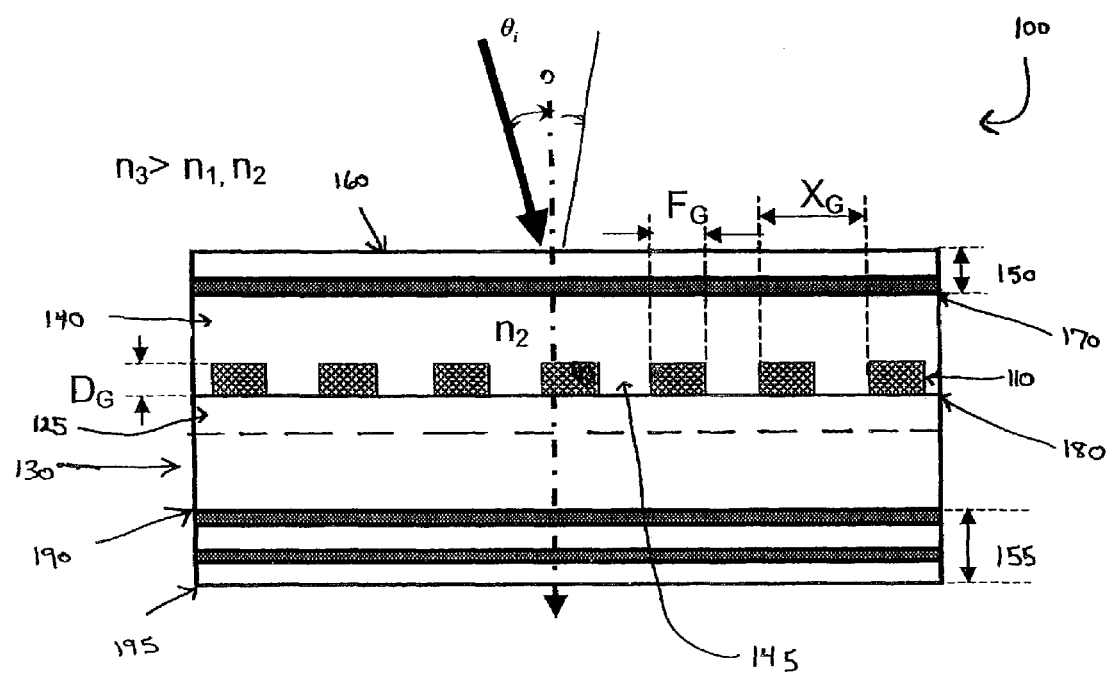

Referring now also to FIG. 1B, there is shown a resonant mirror according to an aspect of the present invention. Resonant mirror 100 as discussed hereinabove may include a lower cladding layer 125 included as a portion of substrate 130. Lower cladding layer 125 may be a separate layer from substrate 130. A separate lower cladding layer 125 thereby replaces substrate 130 and pattern of nanostructures 110 is replicated into lower cladding layer 125. Inclusion of separate lower cladding layer 125 may lessen the constraint that the materials of substrate 130 are suited for replication, possibly a strict constraint depending on the technique used for replicating. Lower cladding layer 125 may take these properties and therefore substrate 130 may be any suitable material and is not constrained by properties required for replication. Lower cladding layer 125 and the substrate 130 may be included within the discussion as substrate 130 while it is known that these may be separate layers.

Pattern of nanostructures 110 may include multiple nanostructures each of width $F_G$ and height $D_G$. Pattern of nanostructures 110 may have a period of nanostructures, $X_G$. The filling ratio of pattern of nanostructures 110, denoted $F_G/X_G$, is the ratio of the width of the higher index area within the period to the overall period. Filling ratio, $F_G/X_G$, may determine the operation wavelength, as would be evident to one possessing an ordinary skill in the pertinent arts.

According to an aspect of the present invention, resonant mirror 100 may reflect or pass transmissions in a certain frequency range depending on the polarization state of the waves as they impinge upon pattern of nanostructures 110.

Pattern of nanostructures 110 may be formed into or onto substrate 130 using any suitable process for replicating, such as a lithographic process. For example, nanoimprint lithography consistent with that disclosed in U.S. Pat. No. 5,772,905, entitled NANOIMPRINT LITHOGRAPHY, the entire disclosure of which is hereby incorporated by reference as if being set forth in its entirety herein. This patent teaches a lithographic method for creating ultra-fine nanostructures 110, such as sub 25 nm, patterns in a thin film coated on a surface. For purposes of completeness, a mold having at least one protruding feature may be pressed into the thin film applied to substrate 130. The at least one protruding feature in the mold creates at least one corresponding recess in the thin film. After replicating, the mold may be removed from the film, and the thin film processed such that the thin film in the at least one recess may be removed, thereby exposing an underlying pattern or set of devices. Thus, the patterns in the mold are replicated in the thin film, and then the patterns replicated into the thin film are transferred into the substrate 130 using a method known to those possessing an ordinary skill in the pertinent arts, such as reactive ion etching (RIE) or plasma etching, for example. Of course, any suitable method for forming a structure into or onto an operable surface, such as the substrate, may be utilized though, such as photolithography, holographic lithography, e-beam lithography, for example. For example, substrate 130 may take the form of silicon dioxide with a thin film of silicon forming pattern of nanostructures 110.

As will be recognized by those possessing ordinary skill in the pertinent arts, various patterns may be nanoimprinted onto substrate 130. These patterns may serve various optical or photonic functions. Such patterns may take the form of holes, strips, trenches or pillars, for example, all of which may have a common period or not, and may be of various heights and widths. The strips may be of the form of rectangular grooves, for example, or alternatively triangular or semicircular grooves. Similarly pillars, basically the inverse of holes, may be patterned. The pillars may be patterned with a common period in both axes or alternatively by varying the period in one or both axes. The pillars may be shaped in the form of, for example, elevated steps, rounded semi-circles, or triangles. The pillars may also be shaped with one conic in one axis and another conic in the other. In an aspect of the present invention an underlying one-dimensional (1-D) pattern of nanostructures 110, preferably formed of materials of high contrast reflective index may be formed on substrate 130. This 1-D pattern may be of the form of trenches, for example. According to an aspect of the present invention, two-dimensional (2-D) pattern of nanostructures 110, preferably formed of materials of high contract refractive index may be formed on substrate 130. This 2-D pattern may be of the form of pillars, for example.

As is known in the pertinent arts, transmission impinging on a boundary either reflects or transmits or a combination thereof depending on properties of the transmission including frequency range or wavelength and polarization. Angle relationships for both reflection and refraction may be derived from Fermat's principle. Of course, reflection may be defined as the return of radiation by a surface, without a change in wavelength and may be commonly defined by the "law of reflection". The transmission may be predominately governed by Snell's Law, which relates the refractive indices on both sides of the interface to the directions of propagation in terms of the angles to the normal of the surface. Refraction may be the bending of oblique incident rays as they pass from a medium having one refractive index into a medium with a different refractive index. Of course, the refractive index is the speed of light in vacuum divided by the speed of light in the medium. Because the refractive index is a function of wavelength, the angle of the refracted transmission and the quantity of transmission reflected and refracted are a function of the wavelength. In general, the interaction of transmissions and mediums as a function of the wavelength of the transmission is well known by those possessing skill in the pertinent arts.

As is known in the pertinent arts, high reflectivity may be achieved by utilizing multiple layers of alternating high contrast refractive indices. If a transmission impinges onto a structure consisting of multiple layers of such refractive indices, multiple reflections take place within the structure.

As a general rule, the more properly designed layers, the higher the reflectivity as each new layer adds to the interacting reflected transmission. However, as set forth, multilayer films may generally not be robust to variations in angle of incidence, though.

Substrate 130 may have a refractive index $n_1$ approximately equal to the refractive index $n_2$ of cladding layer 140. Refractive indices $n_1$ and $n_2$ may be on the order of approximately 1.5. This may serve to reduce undesirable refraction or reflection at interface 180 as transmissions pass therethrough. Of course, the greater the difference between these two refractive indices ($n_1$, $n_2$) the greater the reflection and refraction that may occur at interface 180 as defined by laws commonly known in the art, for example Snell's Law governing refraction and the Law of Reflection. Filling material 145 has a refractive index $n_F$ approximately equal to refractive indices $n_1$ and $n_2$ thereby creating $n_F \approx n_1 \approx n_2$. Filling material 145 may be positioned between the pattern of nanostructures and may be deposited in this region between the high index gratings using methods known by those possessing an ordinary skill in the pertinent arts.

Anti-reflection coatings (ARC) 150, 155 may be provided on one or both of interfaces 170, 190. In FIG. 1A, both ARC 150 and ARC 155 are included. ARCs 150, 155 generally decrease losses resulting from differences in refractive indices at interfaces 170 and 190. The use and manufacture of ARCs 150, 155 is well understood by those possessing an ordinary skill in the pertinent arts. Briefly, ARCs 150, 155 may include a single coating of a refractive index chosen to substantially eliminate reflections at a desired wavelength. ARCs 150, 155 may include multi-layer coatings to reduce losses over an expanded spectrum, or a spectrum in which the device or component is designed to be used. For purposes of completeness, anti-reflection coatings generally operate to create a double interface by means of a thin film by providing two reflected waves. If these waves are out of phase, they partially or totally cancel. For example, if a coating 150 is a single quarter wavelength thickness having a refractive index less than the element that the coating coats, the two reflections created at each interface 160, 170 associated with ARC 150 are 180 degrees out of phase. In such a configuration, reflected waves are substantially the same amplitude and 180 degrees out of phase thereby substantially canceling each other out. As there is substantially zero reflected transmission, the law of conservation of energy holds that the transmitted transmission approaches 100% of the impinging transmission.

Figure 2A:
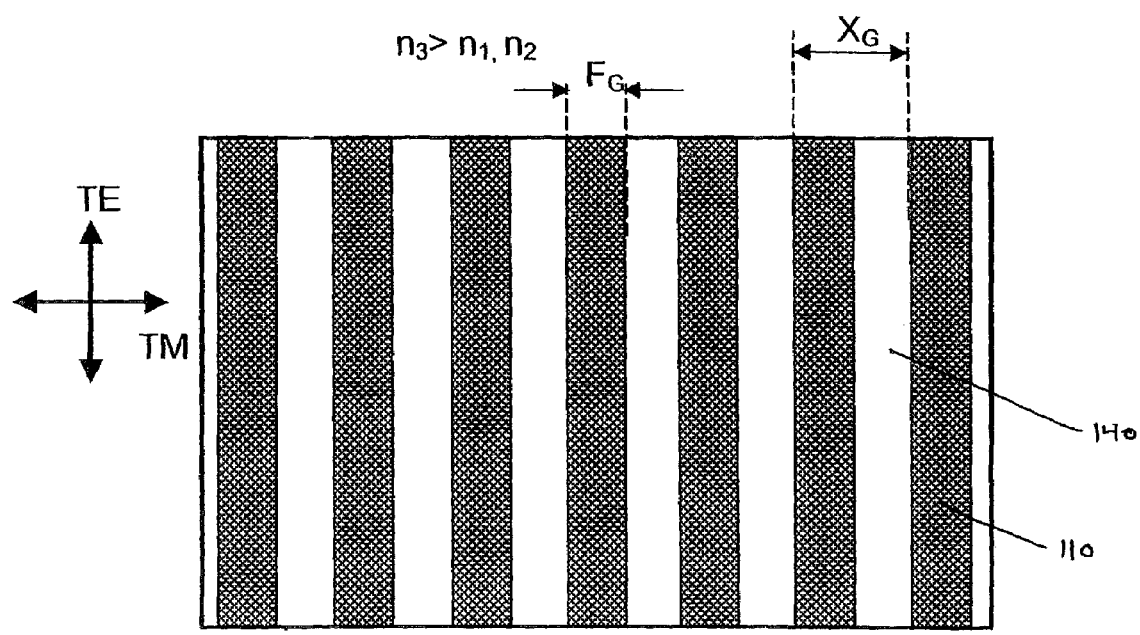
FIG. 2A illustrates a top view of the resonant mirror shown in FIG. 1A, according to an aspect of the present invention.

Referring now also to FIG. 2A, there is shown a top view of a pattern of nanostructures 110 being suitable for use with the resonant mirror 100 of FIG. 1A. Pattern of nanostructures 110 may form an optical grating or grid structure. When a transmission impinges upon the pattern of nanostructures 110, the grid structure transmits radiation with an E vector vibrating perpendicular to the grid (TM shown in FIG. 2A) and reflects radiation with an E vector vibrating parallel to the grid (TE shown in FIG. 2A).

Figure 2B:
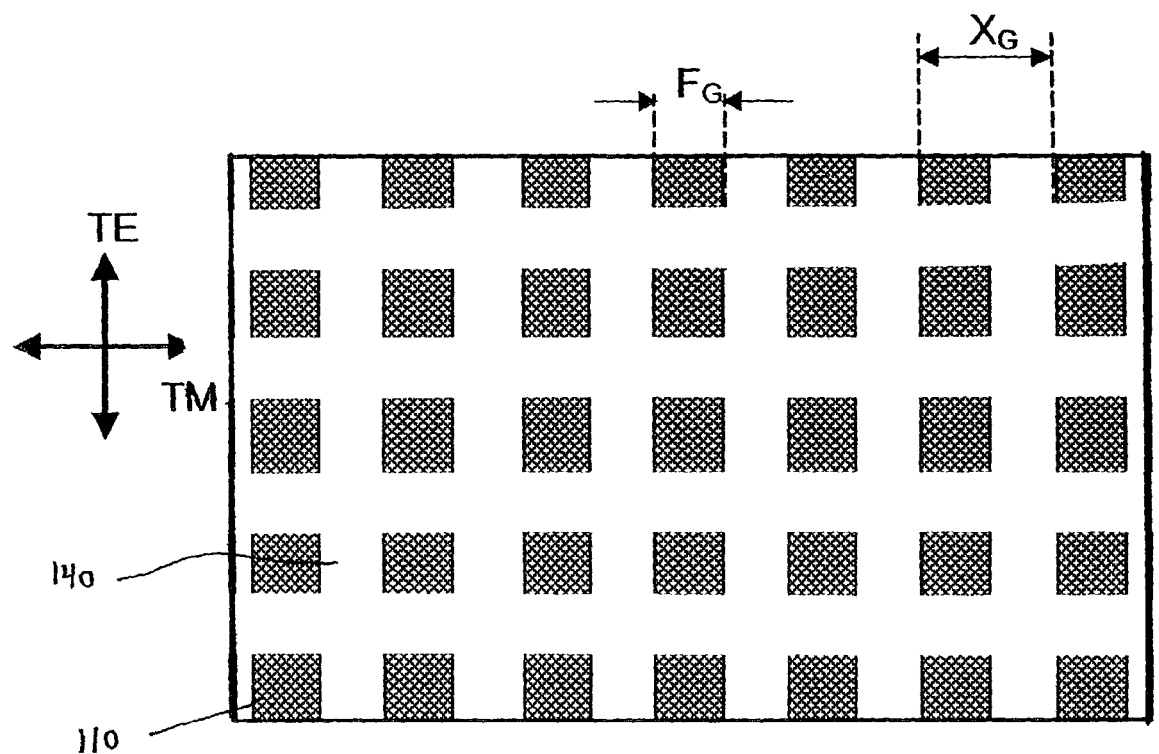
FIG. 2B illustrates a top view of a resonant mirror according to an aspect of the present invention.

Referring now also to FIG. 2B, there is shown a top view of a pattern of nanostructures 110 being suitable for use with a resonant mirror. According to an aspect of the present invention, pattern of nanostructures 110 may form an array of pillars. When transmission impinges upon the pattern of nanostructures 110, the pillar array may reflect and transmit the transmission without the polarization dependent effects discussed hereinabove.

Referring again to FIG. 1A, when transmissions impinge upon resonant mirror 100 at interface 160, the transmission may be reflected and refracted. The amount of the transmission reflected and refracted depends upon the factors discussed hereinabove, for example the refractive index of material in which the transmission was propagating, such as a core of an optical fiber or air for example, and the refractive index of ARC 150. If ARC 150 is provided, the quantity of reflected transmission resulting from interface 160 may be relatively small. The transmission portion refracted at interface 160 propagates through ARC 150 and impinges upon cladding layer 140 at interface 170. Again, this transmission is reflected and refracted at interface 170 with the quantity of each being dependent upon the refractive index of ARC 150 and $n_2$ (the refractive index of cladding layer 140) and other properties discussed herein above, for example. If ARC 150 is provided the reflected portion at interface 170 is likely to be small. Again, refracted portion of the impinging transmission propagates through cladding layer 140 and impinges upon the pattern of nanostructures 110.

The propagating transmission is reflected and refracted governed by the relationships discussed hereinabove, including between refractive indices $n_2$, $n_3$ and $X_G$, $F_G$, for example. Further, the transmission impinging upon pattern of nanostructures 110 may be governed by the physical property known in the art as diffraction. Of course, diffraction may be generally defined as the effect on transmission as a wavefront of transmission passes through an opening, such as for example an opening of pattern of nanostructures 110, as secondary wavefronts are generated apparently originating from the opening, interfering with the primary wavefront as well as with each other to form various diffraction patterns.

Additionally, the principle of multiple layer thin films, described hereinabove, is employed. The reflected radiation, vibrating parallel to the grid structure interacts with pattern of nanostructures 110, similar to the interaction of radiation and multilayer thin films, thereby enhancing reflectivity.

The refracted and diffracted transmission impinges upon substrate 130 of refractive index $n_1$ at interface 180. Again, this transmission may be reflected and refracted. The transmission refracted at interface 180 propagates through substrate 130 and impinges upon ARC 155, if present, at interface 190. Again, the transmission is reflected and refracted as defined above. Again, if ARC 155 is used, the reflected transmission at interface 190 is likely to be small. Again, the refracted transmission propagates through ARC 155 to interface 195, where the transmission is reflected and refracted. If ARC 155 is used the reflected transmission at interface 195 is likely to be small. Finally, the transmitted portion refracted at interface 195 exits the resonant mirror into another medium, such as an optical fiber core or air, for example.

Thus, resonant mirror 100 may serve to select wavelengths and polarization thereby operating as a wavelength selecting polarization selective mirror 100. The resonant mirror 100 may be configured to perform broadband or narrowband wavelength selection, resulting in a resonant mirror 100 having a polarization-dependent forbidden band over certain wavelength ranges, for example. In particular, if the forbidden band for the transverse electric field (TE) is the allowed band for transverse magnetic field (TM) in the optical frequency range then the structure may be used to perform polarization beam splitting and/or combining.

Figure 3:
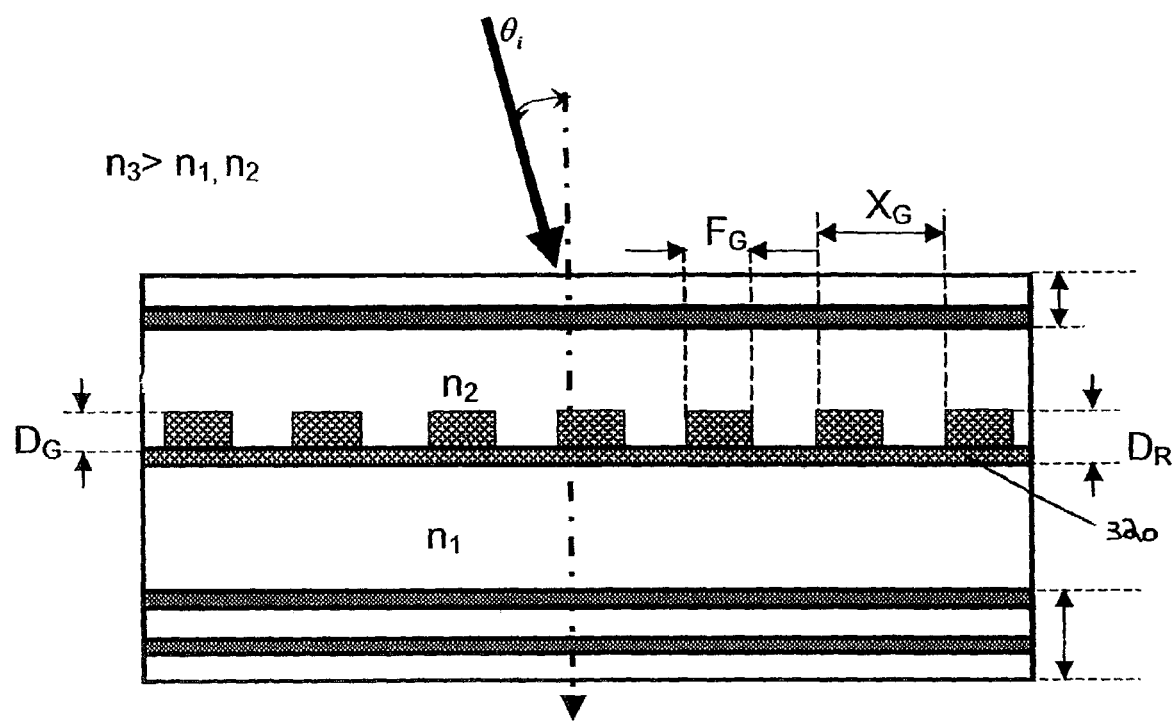
FIG. 3 illustrates a cross-sectional view of a resonant mirror according to an aspect of the present invention.

Referring now to FIG. 3, resonant mirror 100 may also have a residual layer 320 of refractive index $n_3$. Residual layer 320 may be placed between grating 110 and substrate 130 along interface 180. Residual layer 320 may increase the thickness of the $n_3$ refractive index region from $D_G$ to $D_R$.

Residual layer 320 may provide increased reflectivity and may be suited for use when resonant mirror 100 is used in reflection for example. Residual layer 320 may be used for a narrow-band mirror or filter, for example.

Figure 4:
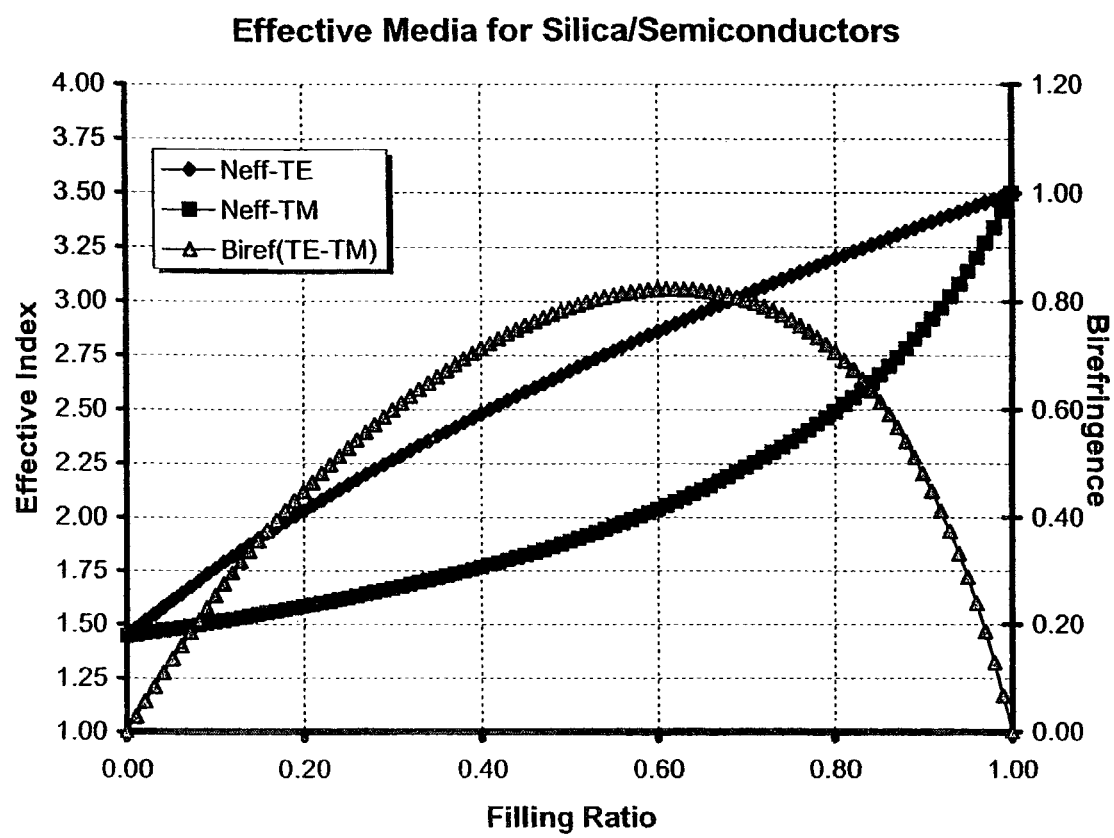
FIG. 4 illustrates a relationship between the effective index, the birefringence and the filling ratio for different polarization states for the resonant mirror embodied in FIG. 1A.

Referring to FIG. 4, there is shown a relationship between the effective index, the birefringence and the filling ratio for different polarization states according to an aspect of the present invention. According to an aspect of the present invention $n_f \approx n_1 \approx n_2 \approx 1.5$ and $n_3 \approx 3.0$. As will be recognized by those possessing an ordinary skill in the pertinent arts, the birefringent qualities of the device vary with filling ratio. Further, the apparent refractive index for each of the polarization states is provided, as a function of the filling ratio.

Figure 5:
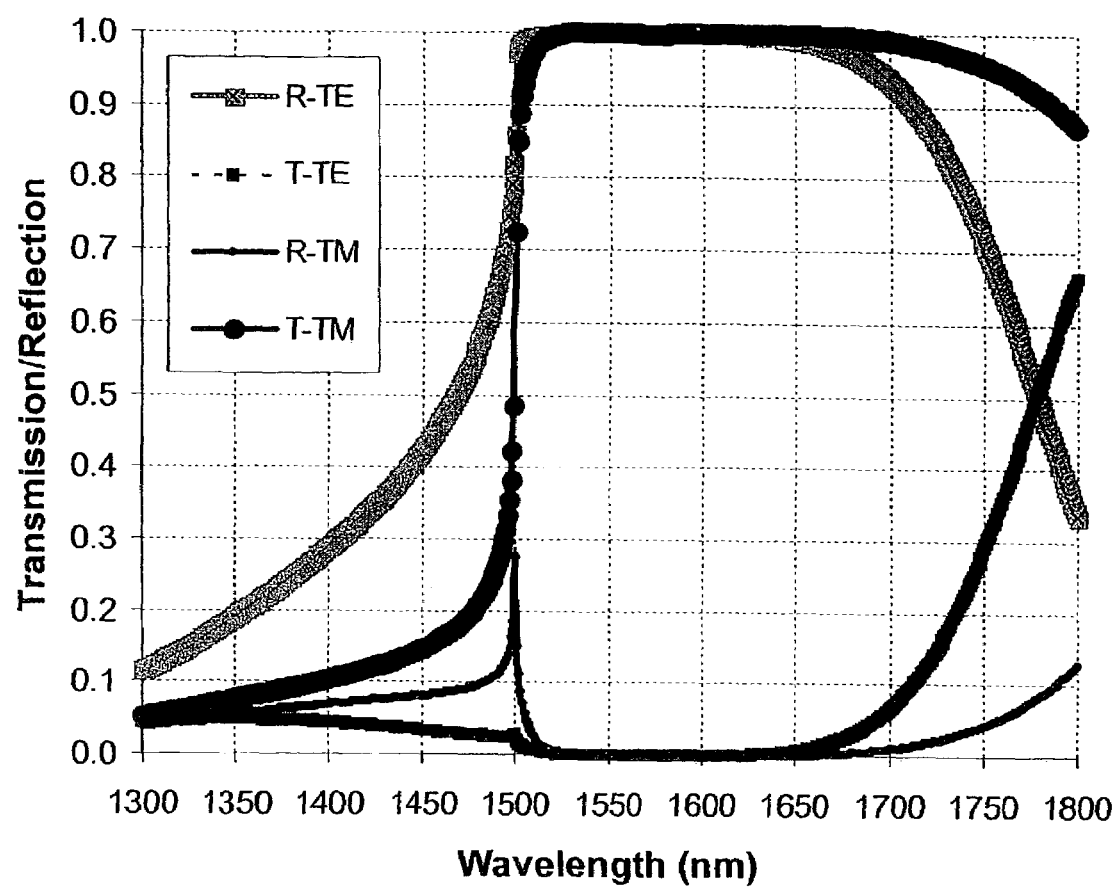
FIG. 5 illustrates a relationship between transmission/reflection and wavelength for different polarization states for the resonant mirror embodied in FIG. 1A.

Referring to FIG. 5, there is shown a relationship between the transmission/reflection and wavelength for different polarization states according to an aspect of the present invention shown in FIG. 1A.

Figure 6:
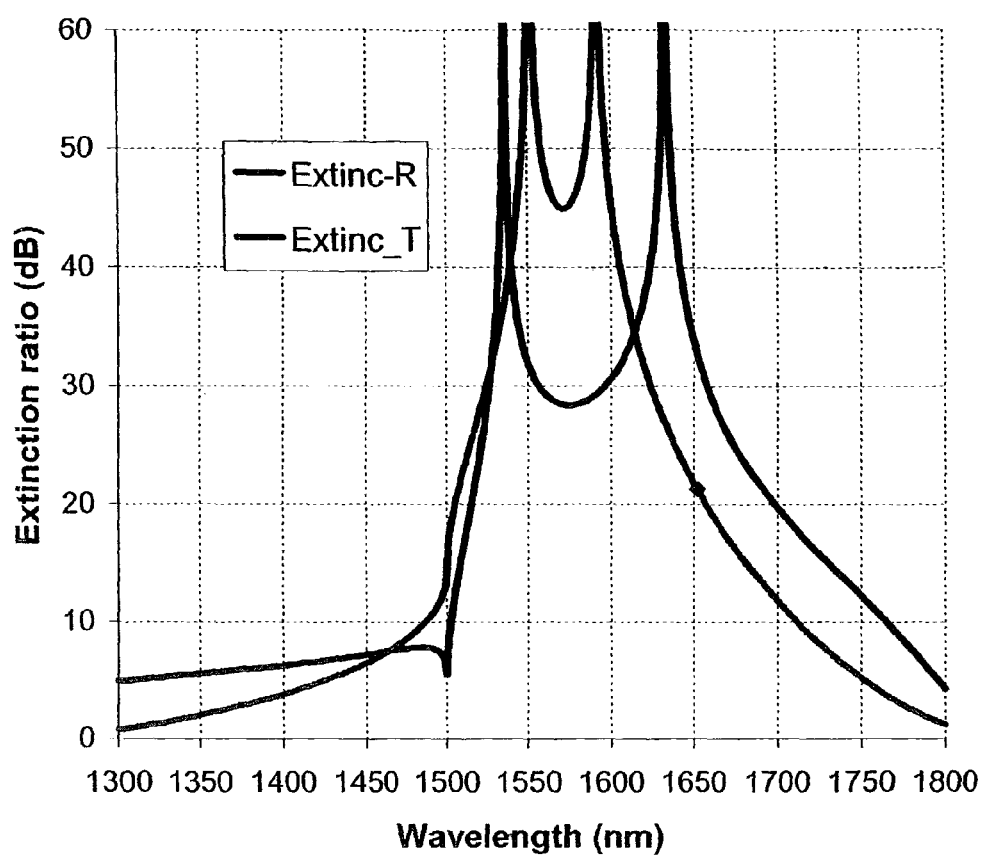
FIG. 6 illustrates the relationship of polarization-dependent extinction ratios for the resonant mirror embodied in FIG. 1A.

Referring to FIG. 6 there is shown a relationship of the polarization-dependent extinction ratios according to an aspect of the present invention shown in FIG. 1A.

Figure 7:
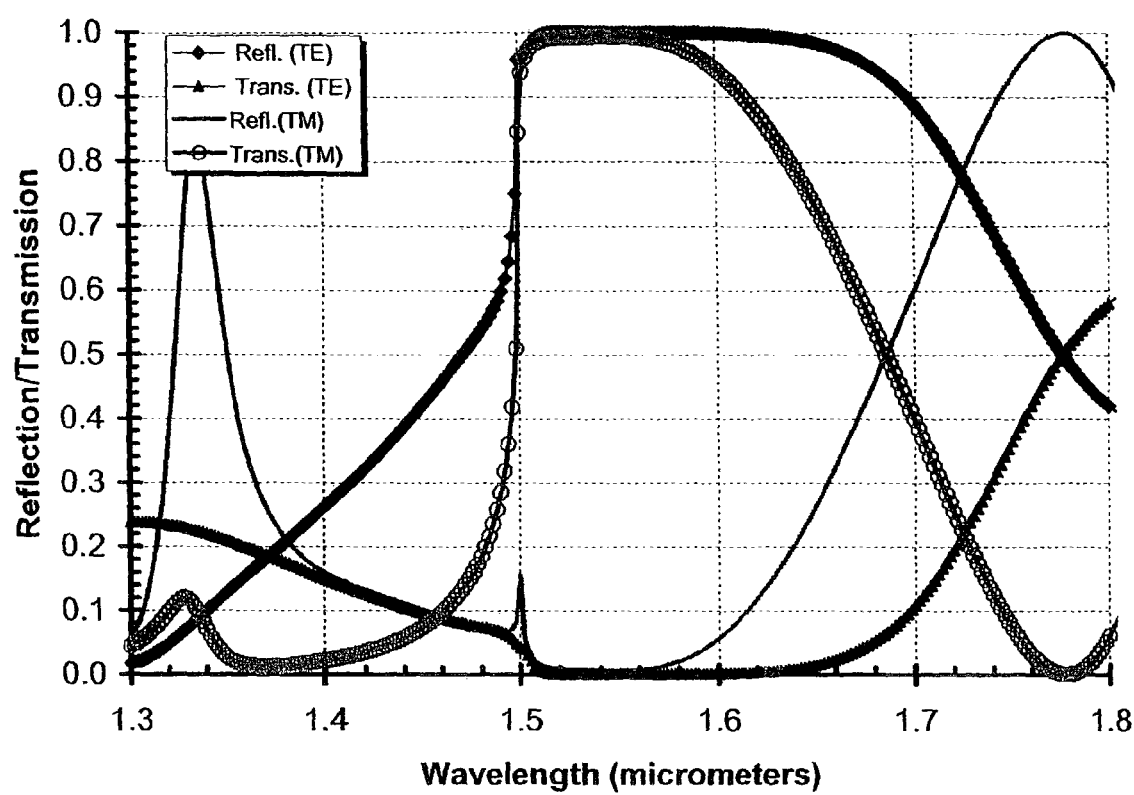
FIG. 7 illustrates a relationship between transmission/reflection and wavelength for different polarization states for the resonant mirror embodied in FIG. 3.

Referring to FIG. 7 there is shown a relationship between the transmission/reflection and wavelength for different polarization states according to an aspect of the present invention shown in FIG. 3 for the embodiment wherein the filling material may take the form of a semiconductor band material. Depicted in FIG. 7 there is shown the band structure as represented by the device in FIG. 3 with $n_3 \approx 3.5$ and the geometrical parameters, period and thickness of the pattern of nanostructures and the index-loading rib in FIG. 3 designed such that the optical waves would be at resonant Bragg condition to the guiding mode.

Figures 8A, 8B:
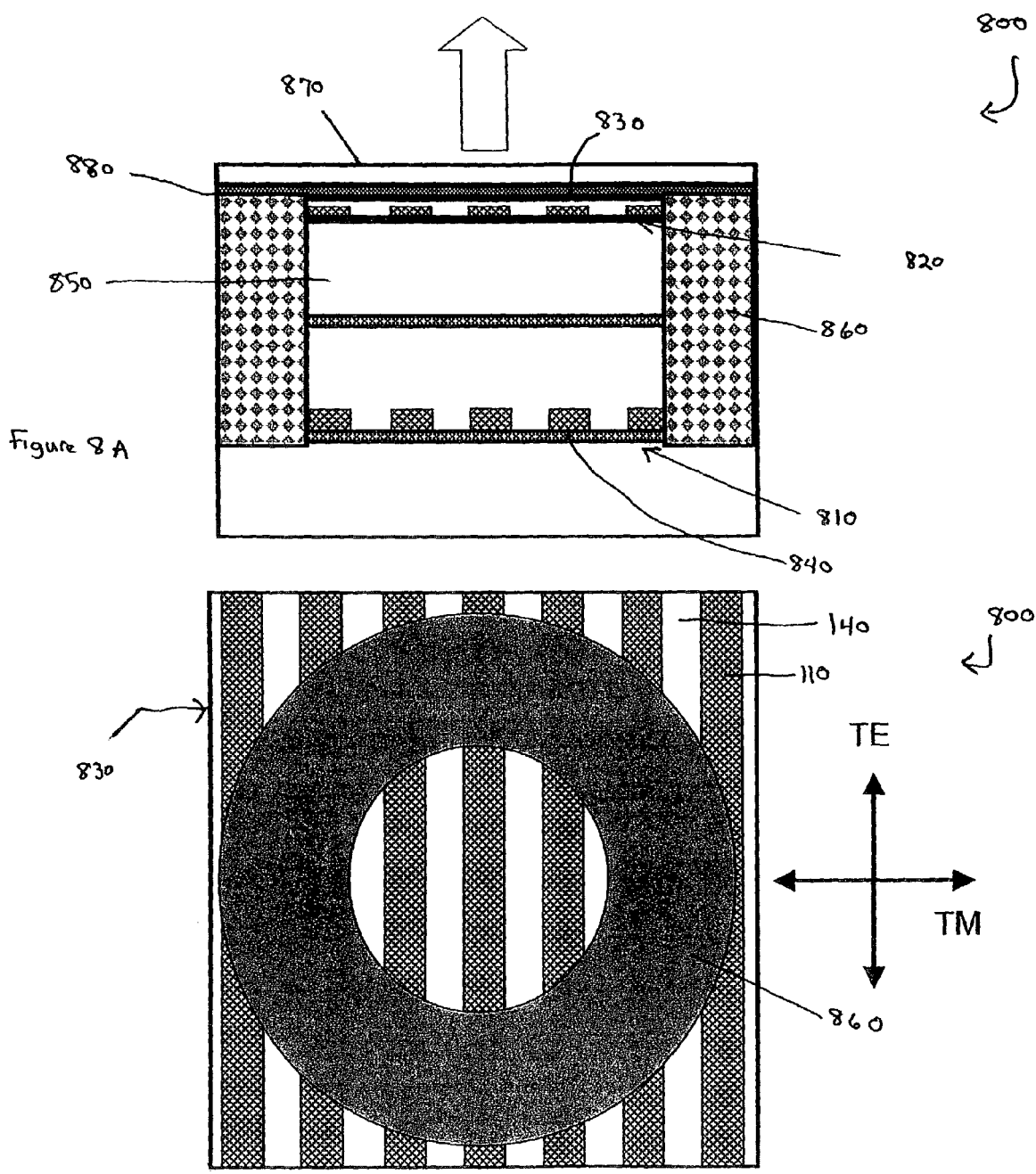
FIG. 8A illustrates a cross-sectional view of a device incorporating the device of FIG. 1A or 3.
FIG. 8B illustrates a top view of the device shown in the cross-sectional view of FIG. 8A, according to an aspect of the present invention.

Referring now to FIGS. 8A and B, there is shown a device 800 incorporating resonant mirror 100. Device 800 may include a first substantially reflective device 810 and a second substantially reflective device 820 each incorporated at distal ends of cavity 850. Device 810 and/or 820 may take the form of device 100 of FIG. 1 or 3, for example. Device 800 may take the form of a type III-V semiconductor compound band vertical-cavity surface emitting laser (VCSEL), for example.

First substantially reflective device 810 may be oriented to reflect a desired polarization as described hereinabove. First substantially reflective device 810 may be additionally or alternatively configured to reflect a desired wavelength band, for example. Cavity 850 may be defined by an oxide/insulator confinement boundary 860. Second substantially reflective device 820 may be provided upon the distal end of cavity 850, with pattern of nanostructures 830 substantially aligned to pattern of nanostructures 840 of first substantially reflective device 810. Second substantially reflective device 820 may be designed to have a reflectivity slightly less than 1.0 with respect to desired polarization and wavelength band, thereby transmitting a portion of the energy resonant in cavity 850 with the desired polarization and desired wavelength band corresponding to first substantially reflective device 810. Use of first substantially reflective device 810 and second substantially reflective device 820 with cavity 850 and confinement 860 may produce a VCSEL with a preferred polarization direction and wavelength band. ARC 870 may be provided on one interface 880. As set forth, ARC 870, if provided, may generally decrease losses resulting from differences in refractive indices at interface 880.

Figure 9A:
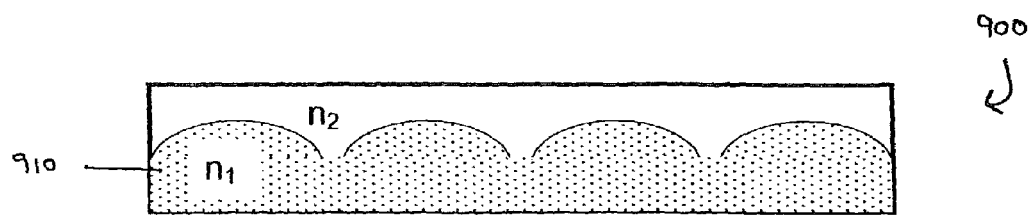
FIG. 9A illustrates a device suitable for incorporating with the device from FIG. 1A or 3.
Figure 9B:
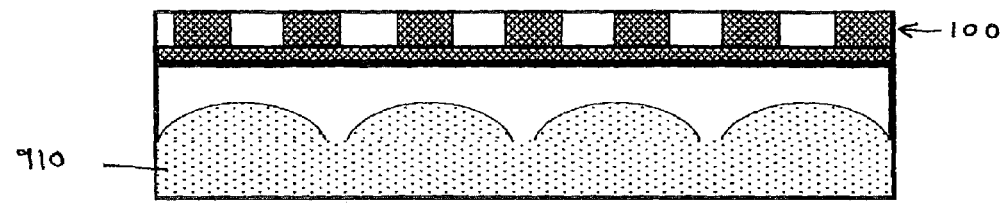
FIG. 9B illustrates a device incorporating the device from FIG. 9A and the device from FIG. 1A or 3.
Figure 9C:
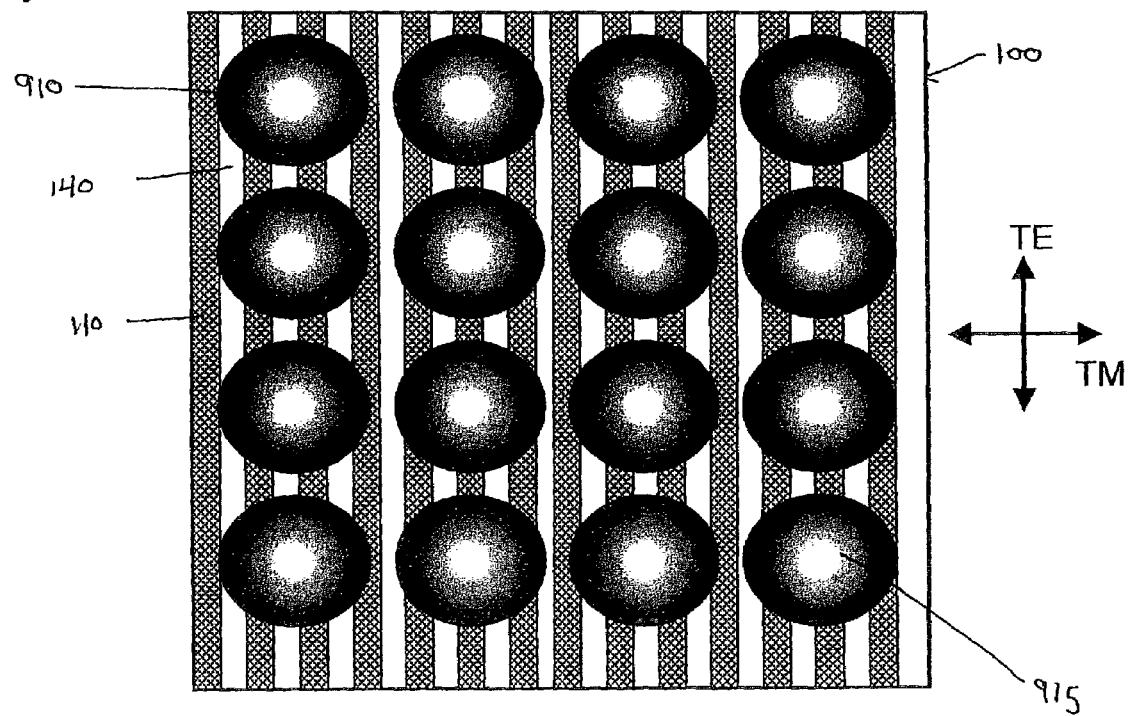
FIG. 9C illustrates a bottom view of the device shown in FIG. 9B.

Referring now to FIGS. 9A, 9B, and 9C, a device 900 incorporating device 100 from FIG. 1 or 3 is shown. Device 900 may include micro-lenses 910 formed in an array 915 aligned to device 100 integrated as a polarization beam splitter and combiner (PBS/C). PBS/C 900 may be formed using a micro-lens 910 the pitch size may be substantially uniform or varied to achieve desired results as will be recognized by those possessing an ordinary skill in the pertinent arts. Each micro-lens 910 may be of a form known to those having ordinary skill in the pertinent arts, such as refractive, diffractive, or hybrid, for example and may have a refractive index $n_m$. Briefly, array 915 includes a plurality of micro-lenses 910 arranged in an ordered or desired pattern. Using micro-lens 910 array 915, it is for each lens 910 to focus incident light on an individual area. In general, the use and design of micro-lens arrays is well known by those possessing skill in the pertinent arts. Resonant mirror 100 may be placed substantially the focal length of micro-lens 910 away from array 915, thereby having each lens 910 of array 915 focus on a corresponding portion of resonant mirror 100.

Figure 10:
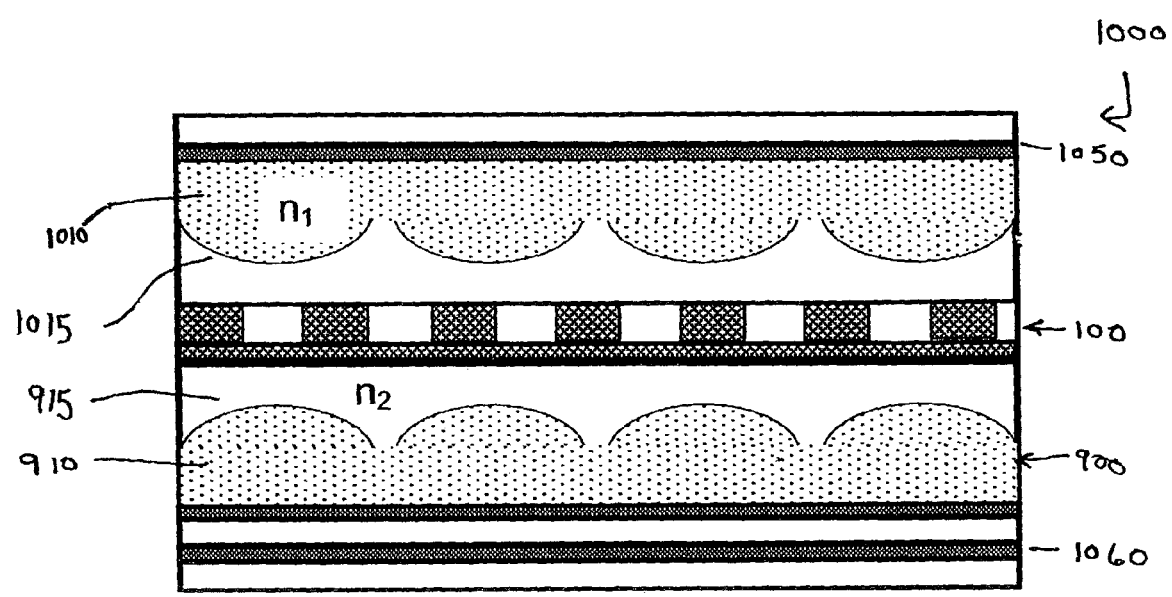
FIG. 10 illustrates a device incorporating the device of FIG. 9.

Referring now to FIG. 10, there is shown a device 1000 incorporating device 900 of FIG. 9. According to an aspect of the present invention, a second micro-lens 1010 array 1015 having a refractive index $n_m$ may be added to device 900. Second micro-lens 1010 array 1015 may be aligned on a surface of resonant mirror 100 distal to micro-lens array 915 for example. Micro-lens array 1015 may be aligned such that each lens 1010 array 1015 is substantially aligned to a corresponding lens 910 in a telecentric mode. An ARC 1050 may be applied to a surface of array 1015 distal to resonant mirror 100. Similarly, an ARC 1060 may be applied to a surface of array 915 distal to resonant mirror 100.

Referring now to FIGS. 11A and B, a device 1100 suitable for use with device 1000 of FIG. 10 is shown. Device 1100 may include a substrate 1110, and fibers 1130. In FIGS. 11A and B, there is shown a substrate 1110, for example a silicon wafer, lithographically patterned with selective portions etched 1120 through. Portions etched 1120 through may be sized to accept one or two single-mode or multi-mode fibers 1130, for example. Fibers 1130, which may be polished to optical flatness and may be AR coated, as known in the pertinent arts, may be fed through etched portions 1120 and fixed in place. Polarization maintaining fibers 1130 may be used for example, and two orthogonal axes of the polarization maintaining fibers 1130 may be aligned into orthogonal positions inside each etched portion 1120.

Figure 11:
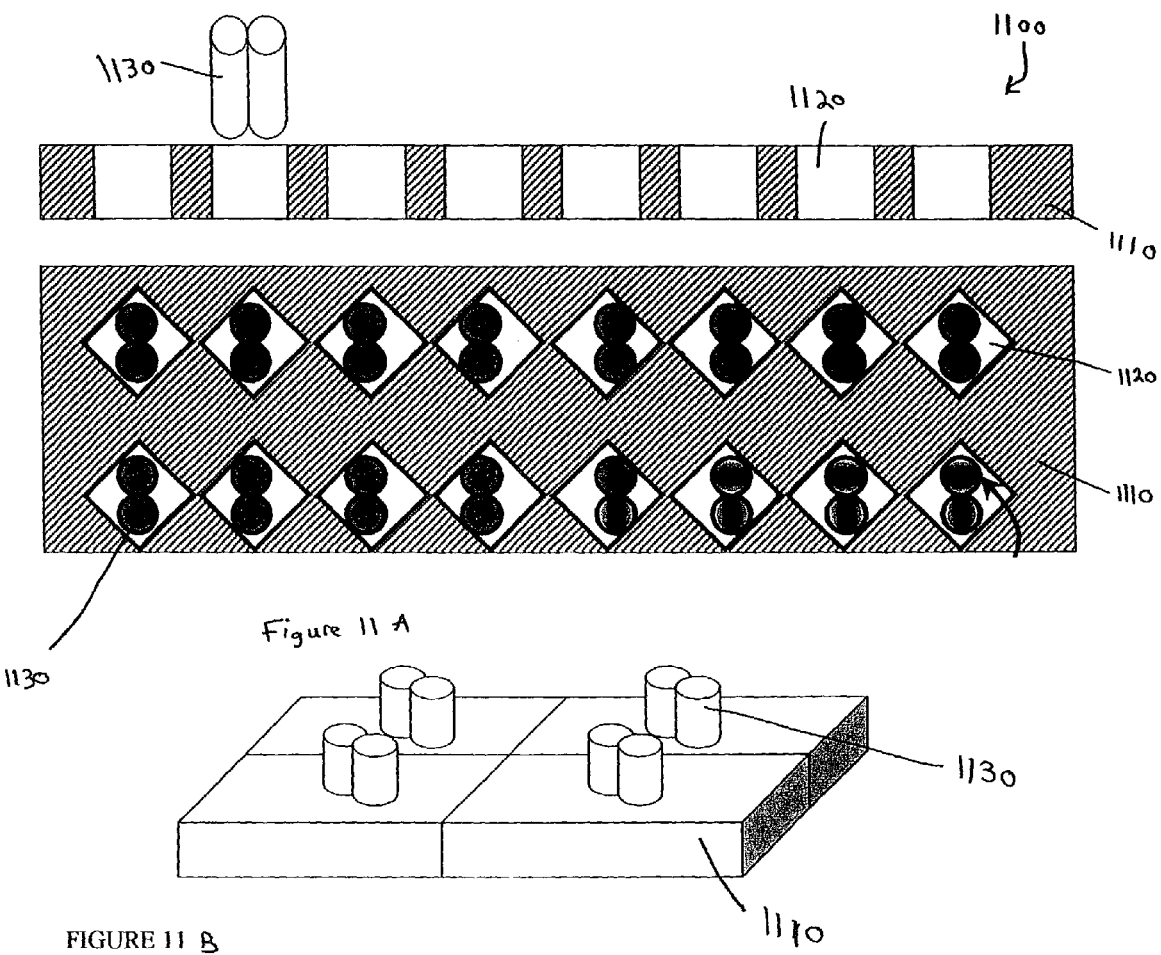
FIG. 11 illustrates a device suitable for use with the device of FIG. 10.
Figure 12A:
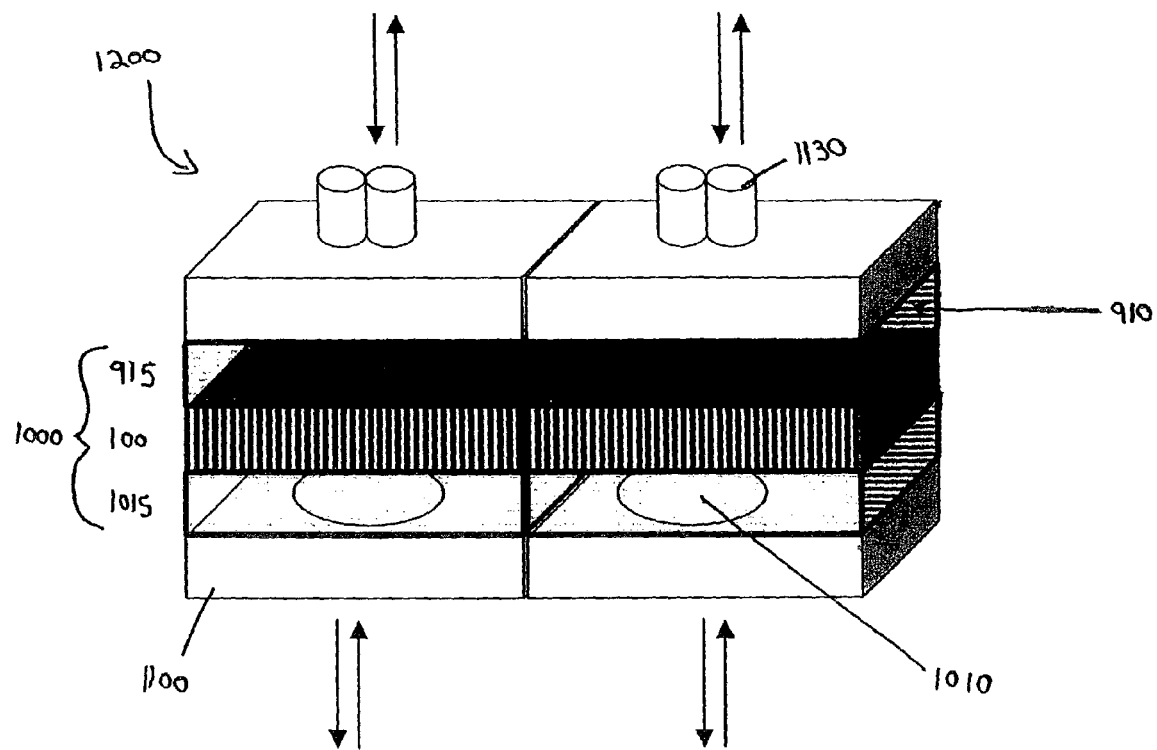
FIG. 12A illustrates a perspective view of a device incorporating the device of FIGS. 10 and 11; and, FIG. 12B illustrates a cross sectional view of a device incorporating the device of FIGS. 10 and 11.

Referring now also to FIGS. 12A and B, there is shown a perspective view and a cross sectional view, respectively, of a device 1200 incorporating device 1100 and 1000 of FIGS. 11 and 10, respectively. Device 1200 including a two dimensional array of fibers 1100 and a resonant mirror 100 is shown. Depicted in FIGS. 12A and B there is a finished multilayer PBS/C array 1200 with fibers 1130 substantially aligned to a corresponding lens 915 of array 910 in a telecentric mode. Lens 1010 array 1015 may be included and substantially aligned to a corresponding lens 915 of array 910 in a telecentric mode on the distal side of resonant mirror 100 from array 915. Resonant mirror 100 may be located at the focal plane of micro-lens array 910 as discussed hereinabove.

Figure 12B:
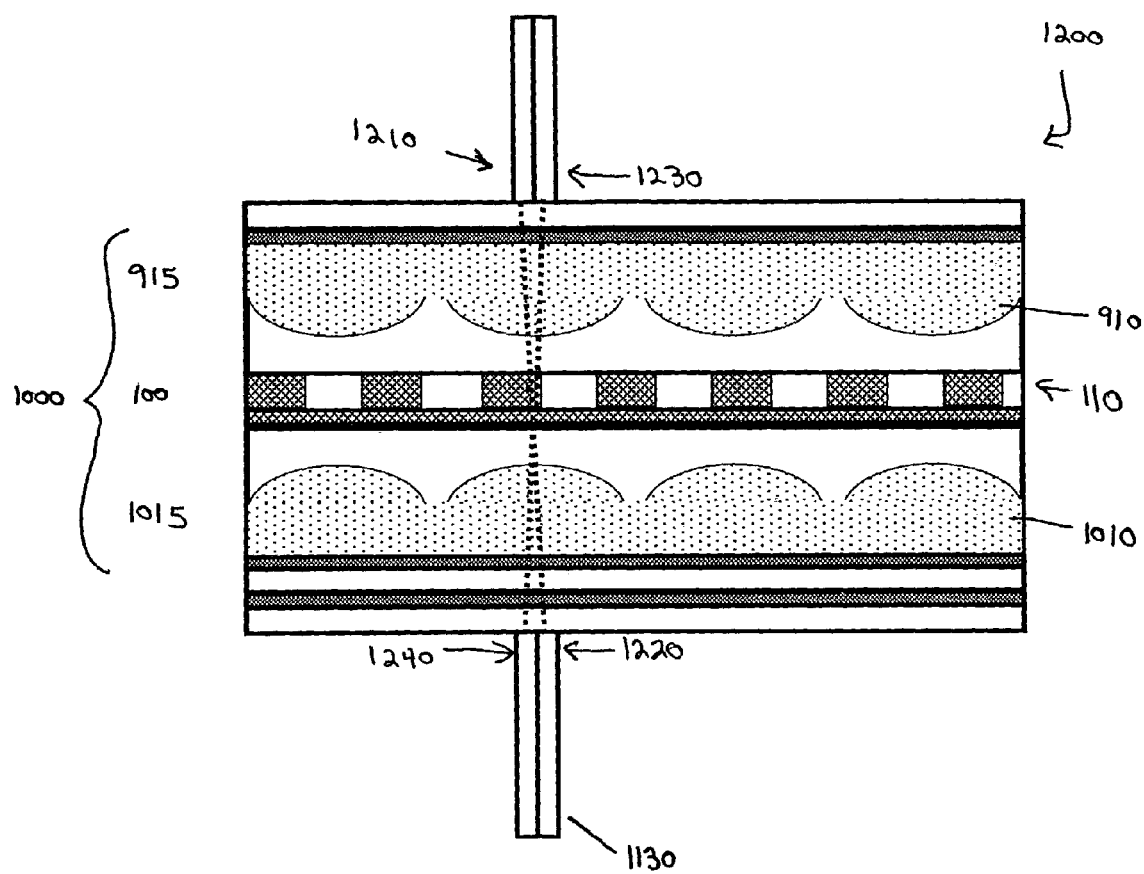

Operationally, for example, PBS/C device 1200 may function as shown in FIG. 12B, wherein input unpolarized transmissions impinge upon resonant mirror 100 via fiber 1210. Based on the discussion herein above, particularly for FIGS. 1-3, polarization selection may occur at pattern of nanostructures 110 within resonant mirror 100. The transmission incident on pattern of nanostructures 110 from fiber 1210 may interact with pattern of nanostructures 110 based on the wavelength and polarization state of the transmission. As shown, for example, pattern of nanostructures 110 may transmit the TM polarization component, in fiber 1220 for example, and reflect the TE polarization component, in fiber 1230 in FIG. 12B. The TE polarization component reflected may be the drop portion of PBS/C 1200. Additionally, as shown in FIG. 12B, an additional fiber 1240 may inject one or more transmissions of polarization TE from the distal end of resonant mirror 100 from fiber 1210. As resonant mirror 100 reflects TE polarized transmission, substantially all of the transmission injected using fiber 1240 may be reflected and collected in fiber 1220 as fiber 1240 is injecting TE polarized transmission. Thus a polarizing beam splitter and combiner is advantageously achieved.

Those of ordinary skill in the art may recognize that many modifications and variations of the present invention may be implemented without departing from the spirit or scope of the invention. Thus, it is intended that the present invention cover the modification and variations of this invention provided they come within the scope of the appended claims and their equivalents.

What is claimed is:

1. A device for reflecting a select polarization of at least one transmission having a given wavelength impinging upon said device, said device comprising:
   a substrate;
   a layer of non-metallic nanostructures positioned over and directly on said substrate and forming a resonant pattern substantially over said substrate adapted to define a plurality of high contrast refractive index interfaces suitable for reflecting said select polarization of said at least one transmission; and
   a cladding layer overlying said substrate, wherein said device for reflecting is a broadband device such that the refractive index of said layer of non-metallic nanostructures is substantially greater than that of said substrate and that of said cladding layer.

2. The device of claim 1, wherein a polarization orthogonal to said select polarization of said at least one transmission is substantially transmitted by said device.

3. The device of claim 1, wherein a polarization orthogonal to said select polarization of said at least one transmission is substantially reflected by said layer of nanostructures.

4. The device of claim 1, wherein said cladding layer is positioned substantially adjacent to said layer of nanostructures and substantially distal to said substrate.

5. The device of claim 4, wherein said cladding layer and said substrate have substantially similar refractive indices.

6. The device of claim 5, wherein said substrate includes a first portion and a second portion, wherein said first portion has a substantially similar refractive index to said cladding layer.

7. The device of claim 6, wherein said second portion and said first portion have substantially the same refractive indices.

8. The device of claim 6, wherein the refractive index of said second portion and the refractive index of said first portion are measurably different.

9. The device of claim 4, further comprising at least one coating operably coupled to said cladding layer and being adapted to at least partially mitigate transmission losses.

10. The device of claim 9, wherein said at least one coating is substantially adjacent to said cladding layer.

11. The device of claim 9, wherein said at least one coating is substantially adjacent to said substrate.

12. The device of claim 9, wherein said at least one coating includes a coating substantially adjacent to said cladding layer and at least one coating substantially adjacent to said substrate.

13. The device of claim 4, further comprising at least one residual layer between said substrate and said cladding and having a substantially similar refractive index to said layer of nanostructures.

14. The device of claim 1, further comprising a plurality of micro-lenses formed into an array substantially aligned with said pattern.

15. The device of claim 14, wherein said micro-lenses have a substantially uniform pitch size.

16. The device of claim 14, wherein said micro-lenses have a substantially varied pitch size.

17. The device of claim 14, wherein said micro-lens array comprises at least one of a refractive, diffractive and hybrid array.

18. The device of claim 14, wherein said layer of nanostructures is positioned such that each of the plurality of lenses of said array focuses on a corresponding portion of said layer of nanostructures.

19. The device of claim 18, wherein the refractive index of said micro-lenses is substantially similar to the refractive index of said substrate.

20. The device of claim 14, further comprising at least a second micro-lens array aligned with said layer of nanostructures.

21. The device of claim 20, wherein the refractive index of said second micro-lens array is different from the refractive index of said substrate.

22. The device of claim 20, wherein said layer of nanostructures is positioned such that each of said second micro-lenses focuses on a corresponding portion of said layer of nanostructures.

23. The device of claim 22, further comprising at least one pair of optical fibers being suitable for use with said at least one transmission, wherein said pair of fibers is optically coupled to at least one of said micro-lenses of said first array.

24. The device of claim 22, further comprising at least two arrays of pairs of optical fibers, wherein a first pair of said fibers is optically coupled to said first micro-lenses in said first array and a second pair of fibers is optically coupled to a second of said micro-lenses in said second array.

25. The device of claim 24, wherein said fibers are polarization maintaining.

26. A method for forming a device for reflecting a select polarization of at least one transmission having a given wavelength, said method comprising:
   forming substrate including a surface for receiving a layer of nanostructures;
   overlaying a film adapted to receive a replication over said substrate;
   replicating a pattern of non-metallic nanostructures in said overlaid film and processing to thereby form a layer of non-metallic nanostructures over and directly on said substrate; and
   forming a cladding layer over said formed layer of non-metallic nanostructures, wherein said device for reflecting is a broadband device such that the refractive index of said layer of non-metallic nanostructures is substantially greater than that of said substrate and that of said cladding layer.

27. The method of claim 26, wherein the step of forming a cladding layer includes forming said cladding layer substantially adjacent to a surface of said layer of nanostructures and substantially distal to said substrate.

28. The method of claim 27, further comprising applying at least one coating substantially adjacent to said cladding layer.

29. The method of claim 27, further comprising applying at least one coating substantially adjacent to a surface of said substrate substantially distal to said cladding layer.

30. The method of claim 27, further comprising including a residual layer substantially adjacent to said substrate and substantially adjacent to said layer of nanostructures.

31. The method of claim 27, further comprising building a confinement boundary formed substantially adjacent to said substrate and adapted to form a cavity with said substrate substantially forming a closure on one end of said cavity.

32. The method of claim 31, further comprising forming a second substrate incorporated to form a closure on an end of said cavity opposite said one end.

33. The method of claim 32, further comprising applying a second layer of nanostructures on said second substrate.

34. The method of claim 32, further comprising enhancing reflection of said select polarization of at least one transmission by orienting said first substrate and said second substrate.

35. The method of claim 27, further comprising substantially aligning a first array including a plurality of microlenses in a telecentric mode with said layer of nanostructures.

36. The method of claim 35, further comprising substantially aligning a second array including a plurality of microlenses in a telecentric mode with said layer of nanostructures.

37. The method of claim 36, further comprising aligning a first pair of a plurality of fibers adjacent to said first array and a second pair of said plurality of fibers adjacent to said second array, said first pair and said second pair aligned in a telecentric mode.

38. A device for polarization independent reflecting of at least one transmission having a given wavelength impinging upon said device, said device comprising:
   a substrate;
   a layer of non-metallic nanostructures positioned over and directly on said substrate and forming a resonant pattern substantially over said substrate adapted to define a plurality of high contrast refractive index interfaces suitable for polarization independently substantially reflecting said at least one transmission; and
   a cladding layer overlying said substrate, wherein said device for polarization independent reflecting is a broadband device such that the refractive index of said layer of non-metallic nanostructures is substantially greater than that of said substrate and that of said cladding layer.

39. The device of claim 38, wherein said cladding layer is positioned substantially adjacent to said layer of nanostructures and substantially distal to said substrate.

40. The device of claim 39, wherein said cladding layer and said substrate have substantially similar refractive indices.

41. The device of claim 40, wherein said substrate includes a first portion and a second portion, wherein said first portion has a substantially similar refractive index to said cladding layer.

42. The device of claim 41, wherein said second portion and said first portion have substantially the same refractive indices.

43. The device of claim 41, wherein the refractive index of said second portion and the refractive index of said first portion are measurably different.

44. The device of claim 39, further comprising at least one coating operably coupled to said cladding layer and adapted to at least partially mitigate transmission losses.

45. The device of claim 44, wherein said at least one coating is substantially adjacent to said cladding layer.

46. The device of claim 44, wherein said at least one coating is substantially adjacent to said substrate.

47. The device of claim 44, wherein said at least one coating includes a coating substantially adjacent to said cladding layer and at least one coating substantially adjacent to said substrate.

48. The device of claim 39, further comprising at least one residual layer between said substrate and said cladding and having a substantially similar refractive index with said layer of nanostructures.

* * * * *

UNITED STATES PATENT AND TRADEMARK OFFICE
CERTIFICATE OF CORRECTION

PATENT NO. : 7,386,205 B2 Page 1 of 1
APPLICATION NO. : 10/463279
DATED : June 10, 2008
INVENTOR(S) : Jian Wang and Xuegong Deng It is certified that error appears in the above-identified patent and that said Letters Patent is hereby corrected as shown below:

Column 10, line 35, in claim 23, delete "transmission,wherein", insert --transmission, wherein-- (consider space).

Column 10, line 47, in claim 26, after "forming" insert --a--.

Signed and Sealed this

Second Day of September, 2008

JON W. DUDAS
*Director of the United States Patent and Trademark Office*